United States Patent

[11] 3,578,342

| [72] | Inventors | James Glenn Satterthwaite<br>5001 Dogwood Trail, Portsmouth, Va. 23703;<br>James B. Macy, Jr., 107 River Drive, Morehead City, N.C. 28557 |
|---|---|---|
| [21] | Appl. No. | 791,082 |
| [22] | Filed | Jan. 14, 1969 |
| [45] | Patented | May 11, 1971 |

[54] SHAFT SEAL
6 Claims, 6 Drawing Figs.

[52] U.S. Cl. ........................................ 277/9, 277/34, 277/69
[51] Int. Cl. ........................................ F16j 9/00, F16j 15/46
[50] Field of Search ........................................ 277/9, 34, 69, 34.3

[56] References Cited
UNITED STATES PATENTS

| 2,648,554 | 8/1953 | Gilbert, Sr. .................. | 277/34 |
| 2,864,631 | 12/1958 | Kemp ........................ | 277/34 |
| 2,925,291 | 2/1960 | Bygbjerg .................... | 277/9X |
| 3,015,505 | 1/1962 | Smith ........................ | 277/69X |

Primary Examiner—Samuel B. Rothberg
Attorney—McNenny, Farrington, Pearne & Gordon

ABSTRACT: There is a shaft seal characterized by an inflatable seal and compressible packing seal means arranged in tandem about a shaft and including between the two sealing means, fluid inlet means for admission of lubricating fluid for a stern tube bearing. The inflatable seal is constructed and arranged to insure it does not contact the shaft excepting when its operation as a seal is desired. These devices are particularly useful as journal seals in marine installations for shafts extending through a vessel or hull.

Patented May 11, 1971

INVENTORS
JAMES GLENN SATTERTHWAITE,
& JAMES B. MACY, JR.

BY
McNENNY, FARRINGTON, PEARNE, & GORDON
ATTORNEYS

Patented May 11, 1971
3,578,342
2 Sheets-Sheet 2
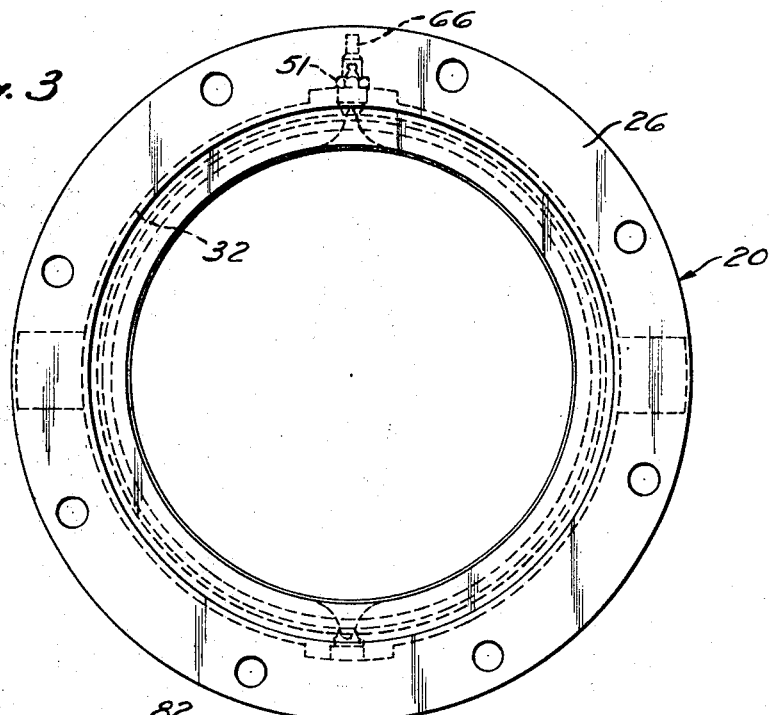
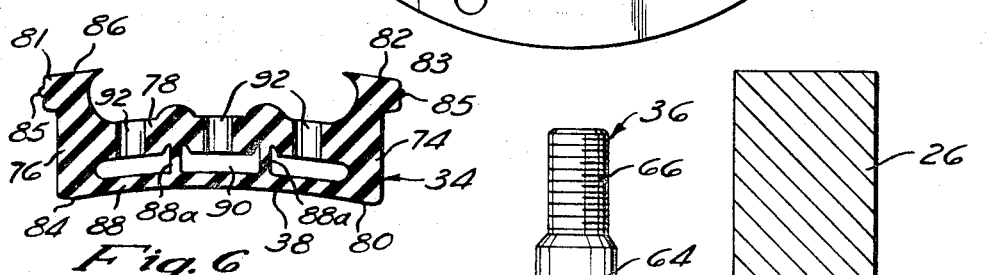
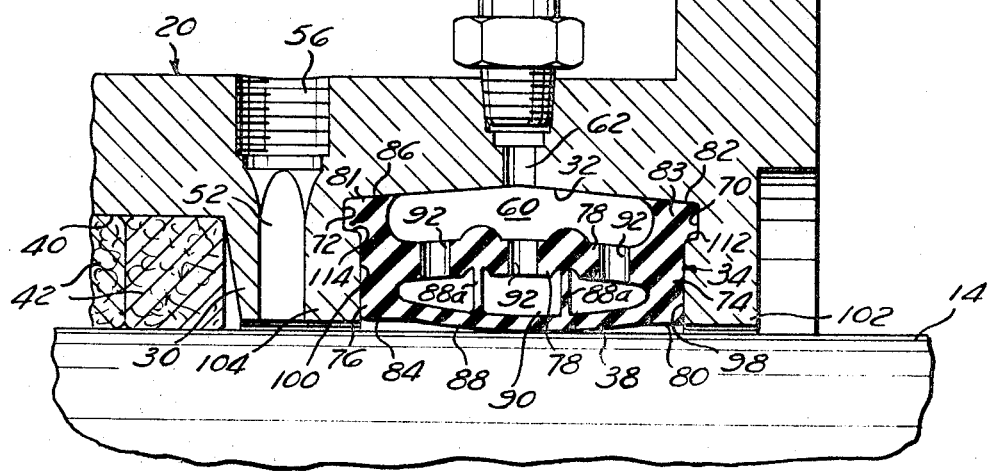
INVENTORS
JAMES GLENN SATTERTHWAITE,
& JAMES B. MACY, JR.
BY
McNENNY, FARRINGTON, PEARNE & GORDON
ATTORNEYS

SHAFT SEAL

BACKGROUND OF THE INVENTION

The present invention relates generally to shaft seals of particular utility in apparatus where a shaft extends through the wall of a vessel, for example the propeller shaft for a marine vessel, and more particularly to journal seals including selectively operable seal means for temporarily sealing out water while the main packing seal is undergoing replacement. The invention will be described in reference to propeller shaft for marine uses, it being understood, however, that the principles of this invention may be employed in other applications.

In marine installations, the propeller shaft as it passes through the hull of a vessel may be supported by a water-lubricated rubber bearing or the like. An example of such a bearing is described in our U.S. Pat. No. 3,407,779. When such bearing is located in the stern tube a shaft seal is provided inboard of the bearing to prevent water from entering the hull. In addition to providing a seal to prevent the flow of sea water into the hull, this sealing assembly is also conveniently utilized for the forced admission of lubricating fluid to the stern tube or shaft bearing. Vessels commonly encountering polluted waters in harbors or inland waterways, often utilize filtered water applied to the bearing from inside the vessel which flows through the shaft bearing in an outboard direction under positive pressure.

These prior structures have often utilized a fibrous packing body compressible by a packing gland into sealing relation with the shaft. The lubricant for this purpose was principally provided by allowing the packing to be sufficiently loose to permit a controlled amount of water to flow in an inboard direction not only for lubricating purposes but also for cooling the stuffing box or packing assembly. Water is not a preferred lubricant for fibrous packing members in confronting relation with a relatively moving shaft.

When it was necessary to replace the packing, and in order to avoid removal of the vessel from the water, a temporary, selectively operable sealing means in the form of an inflatable tube or pneumatic seal has been provided in the shaft seal apparatus outboard of the fibrous packing member or members. When inflated, these sealing means distended inwardly and peripherally contacted the shaft with a force sufficient to withstand the hydrostatic pressure of water attempting to flow into the hull along the shaft thereby permitting replacement of the fibrous packing member or members while the vessel remained in the water. Examples of such seals are disclosed in the U.S. Letters Pat. Nos. 2,648,554, 2,946,608, and 3,121,570.

In the past difficulty has been encountered with seals of this general type since they have tended to wear and fail. The wearing failure of such seals has tended to occur from two causes. First when the seal was inflated, the rubber forming the seal tended to stretch causing contact to be maintained between the seal and shaft even when the seal is deflated. Such contact over a period of time tends to cause wear and seal failure. Further the deflating or exhausting of the seal after it has been inflated is often not complete and a small residual pressure remains in the seal. When this occurs a light contact is again maintained with the shaft and wear occurs.

For these reasons it has been customary to form seals of this general type so that they may be replaced when they become worn. Making the seals replacable tends to be expensive and is undesirable if replaceability is not required. A further disadvantage has been present in the type of seals contained in the prior art devices since the lubricating means for introducing lubrication into the bearing is located outboard of the inflatable seal. Such lubrication means employed a distribution channel which required the length of the shaft seal housing to be extended.

SUMMARY OF INVENTION

The present invention is an improvement upon the foregoing prior art devices. In the fabrication of marine journal bearings and seals, for example, the materials of construction are often expensive because of the environment in which the apparatus operates, and means for reducing the size without sacrifice of effectiveness is to be desired. The present invention effects a reduction in size because of the structural improvements.

Also a novel and improved inflatable seal structure is provided which insures the seal material is spaced from the shaft excepting when the seal is inflated into sealing engagement with the surface of the shaft. The illustrated embodiment is arranged so that the seal returns to its deflated condition even when some positive residual pressure remains in the seal. Further the structure is arranged so that the material forming the seal is not stretched when the seal is inflated for operation.

The present invention also provides for lubrication of the packing with grease, the preferred lubricant material for the interface between fibrous packing means and a relatively moving metal shaft while simultaneously admitting water or other lubricating fluid to the stern tube bearing. In the improved structures of the present invention, grease may be introduced within the packing for axial flow between the confronting surfaces of the packing means and the relatively moving shaft.

Still further, instead of introducing the bearing lubricating medium, e.g. water, for lubricating the stern tube bearing through a plenum which requires an extension of the housing to accommodate the plenum structure, utilization is made of fluid inlet means disposed in a shoulder or internal flange which isolates the inflatable sealing means from the fibrous packing sealing means while also serving as a stop means for the packing.

A novel and improved shaft seal incorporating the characterizing elements of this invention utilizes a seal housing, preferably circular in cross section and having a pair of axially spaced, inwardly directed, peripheral shoulders or flanges which define a first recess. The first recess is adapted to contain a selectively operable reversible arch type of seal formed from, for example, an elastomeric body and having fluid inlet means communicating with the exterior of the housing whereby fluid can be selectively introduced and released therefrom to expand and contract the reversible arch seal. Upon inflation with a fluid under pressure, e.g. air, the shaft-confronting surface of the seal, which is normally spaced and curved away from the shaft at predetermined clearance, is reversed, causing it to engage the shaft and thus provide a tight peripheral seal suitable to prevent the flow of water axially along the shaft from the outside of the hull into the vessel. Upon release of the fluid pressure, radially spaced elastomeric ribs located within the inner seal channel, retract forcibly causing the shaft-confronting surface to move outwardly across its centerline and away from the shaft to its normal retracted position. The seal material and configuration are arranged so that the material of the inner wall of the seal is not stretched when the seal is inflated.

A second internal recess is also provided in the seal housing adapted to contain packing members, particularly fibrous packing members of conventional makeup and which may be compressed in the normal manner by the telescoping action of a packing gland coacting therewith. In the usual embodiment of shaft seals of the present invention, the shaft rotates relative to the seal as in the case of a ship's propeller shaft. In some installations, the shaft may undergo axial motion relative to the seal or a combination of rotary and axial motion. In order to accommodate such relative motion, lubricating means are provided. For the packing members, grease is conveniently provided by means of a "lantern" ring disposed intermediate the axial extremities of the fibrous packing means and communicating through the seal housing with a supply of grease under pressure. In order to provide fluid lubricant for the bearing which, as indicated above, is preferably a rubber bearing of the type described in our patent cited above, fluid inlet means are provided in the peripheral flange disposed between the reversible seal and the packing means. Filtered water, for example, may be introduced at this point in the apparatus and the utilization of additional length of housing to accommodate a filtered water distributing plenum is thereby rendered unnecessary. The necessity for cooling the stuffing box is also avoided in embodiments of the present invention because the fibrous packing members in such embodiments are lubricated with the proper lubricant, e.g. a mineral oil based grease.

Briefly stated, therefore, the present invention is in a shaft seal or a stuffing box comprising in combination a housing having at least a pair of axially spaced inwardly directed peripheral shoulders or flanges each having a shaft-confronting surface and defining between them a first peripheral recess. A reversible seal member is disposed in the first recess, and coacts with fluid inlet means extending through the housing for selectively distending said seal for tight, liquid sealing engagement with a shaft.

A second peripheral recess bounded at one end by one of said peripheral shoulders or flanges is provided to receive an annular packing member or members. A packing gland is provided and dimensioned to extend in an axial direction into said packing recess for telescoping coaction therewith as a movable boundary for second peripheral recess and whereby the packing member or members may be compressed by the telescoping action of said packing gland into the seal housing. The reaction member to such compressive action is desirably the inner shoulder or flange member. Fluid inlet means are provided in the shaft-confronting surface of said innermost flange or shoulder for enabling the introduction of a fluid, e.g. water, for axial movement along the shaft in a clearance between the shaft, the reversible seal in its relaxed condition, and the outermost of said inwardly directed flanges and into the interface between the shaft and the bearing material, for example rubber, in the stern tube bearing means.

In a preferred embodiment, the reversible seal is formed of a resilient material, and comprises a body dimensioned to fit into said first peripheral recess and to form with said recess a primary chamber into which a fluid, e.g. air, may be pumped under pressure. A secondary chamber is formed by the body and communication means with the first chamber are provided. When the pressure is increased in the first chamber, the second chamber is also pressurized causing movement of the shaft-confronting wall of the reversible seal to bring it into solid contact with the shaft. The movement of the shaft-confronting wall from its normal concave shape to a convex shape against the shaft does not produce any substantial stretching of the wall material but does place tie ribs in tension. These tie ribs assist retracting the inner wall to its normal position when the seal is deflated.

The body is preferably provided with lateral ribs or projections dimensioned so that such ribs and the sidewalls of the seal coact with the sidewalls of the recess under compressive stress to improve the surface-to-surface contact between the body and the walls of the recess thereby improving the seal in these regions. This body may also be provided with spaced peripheral flanges extending in opposite directions parallel to the axis for snap-in engagement with corresponding grooves in the walls of the recess.

In this preferred embodiment, the valve for admitting fluid into the primary chamber is in no way associated with the reversible seal member itself. This greatly simplifies construction of the reversible seal member as well as the installation of the valve into the wall of the stuffing box. This effects a substantial improvement as the wall or housing of the stuffing box is simply drilled with a small hole to admit fluid into the primary chamber, and the outer portion of the housing is drilled and tapped to accommodate a standard pipe thread with the same length valve stem being used for each application rather than variable length valve stems as often previously required for seals of different diameter or different application.

DESCRIPTION OF THE DRAWINGS

It is an important object of this invention to provide a novel and improved shaft seal assembly which is particularly suited for use in marine vessels to provide a seal for the propeller shaft as it extends through the hull.

A still further object of this invention is to provide a novel and improved shaft seal of more economical size and construction.

Figure 1:
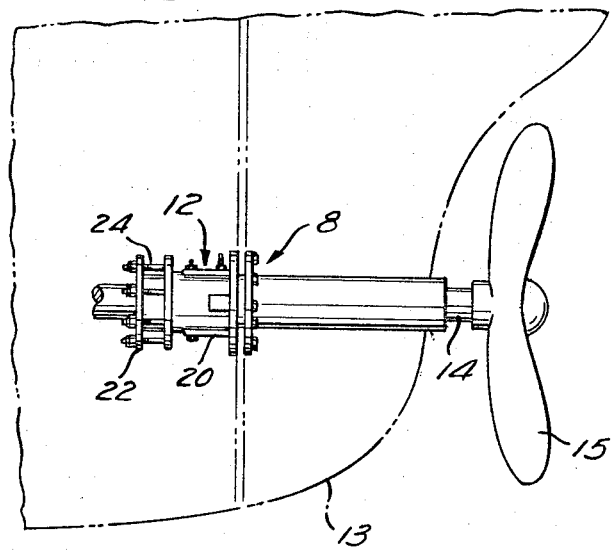

Further objects and advantages will appear from the following description and the annexed drawings wherein:

FIG. 1 is a fragmentary illustration showing utilization of the invention with a propeller shaft extending through the hull of the vessel and showing the location of a shaft seal of the present invention.

Figure 2:
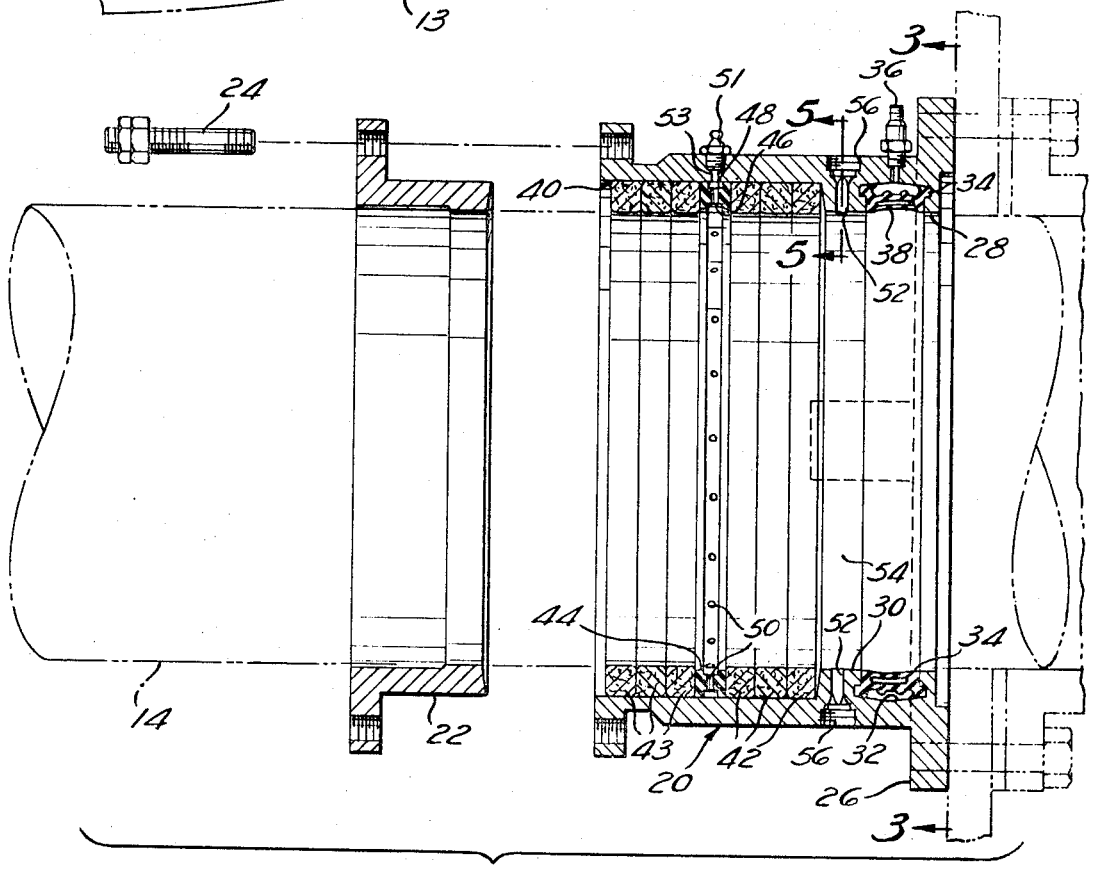

FIG. 2 is a cross-sectional view of a shaft seal embodying the novel features of the present invention and showing a packing gland in exploded relation thereto and, in phantom, a segment of a propeller shaft.

FIG. 3 is a front elevation of the outboard end of the shaft seal.

FIG. 4 shows an enlarged scale of a fragmentary cross section showing a distensible shaft seal of preferred construction in the inflated condition.

Figure 5:
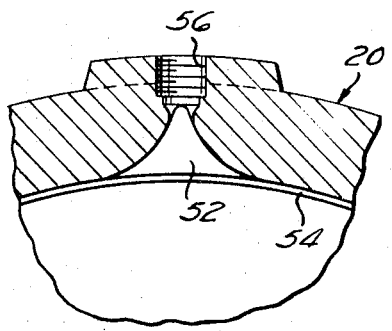

FIG. 5 is an enlarged fragmentary view in cross section of a fluid inlet in an inwardly directed flange within the seal housing as it appears on the plane 5–5 of FIG. 2.

FIG. 6 is an enlarged cross-sectional view of the inflatable shaft seal showing its shape before installation in the packing box.

DETAILED DESCRIPTION OF DRAWINGS

Referring now more particularly to FIG. 1, there is here illustrated a typical installation of a shaft seal of the present invention. The bearing assembly 8 adjacent the hull 13 forms no part of the invention, although details thereof may be found in our patent cited above. The sealing assembly 12 at the stern of the vessel incorporates the improvements of the present invention. Propeller shaft 14 extends out through the hull 13 from the interior thereof through the shaft seal 12 and stern tube 8 and supports a propeller 15 at its outer extremity.

Referring now more particularly to FIG. 2, there is here shown in exploded relation a seal housing 20 and a packing gland 22 and a bolt and nut assembly typical of those used for cooperation between the housing and the packing gland to effect a compressive force on the packing members. A propeller shaft 14 is shown in phantom.

The seal housing 20 is provided at its outboard extremity with a flange 26 which is adapted to be secured by any suitable means to the inner wall of a vessel or a hull of a ship. The internal surface 28 of the flange 26 is dimensioned according to conventional clearances for confronting relation with the propeller shaft 14. An internal flange 30 disposed intermediate the inboard and outboard extremities of the seal housing 20 is provided also having a shaft-confronting surface 54 dimensioned according to conventional clearances with respect to the shaft 14. Between the flange 26 and the internal flange 30 there is provided a recess 32 which is dimensioned to accept and retain an inflatable resilient sealing member 34. The sealing member 34 is selectively operable into and out of watertight sealing engagement with the shaft 14 as will be described in greater detail with reference to FIG. 4. A fluid inlet 36 extends through seal housing 20 and provides for the admission and release of fluid under pressure whereby the sealing surface 38 may be moved into sealing contact with shaft 14 or released therefrom.

In the direction of the inboard extremity of the shaft seal housing 20 there is provided packing member recess 40 dimensioned to receive and retain fibrous packing rings or members of conventional composition and structure. The internal flange 30 provides a convenient packing stop flange and reaction member for coaction with packing gland 22.

In the illustrated embodiment there are provided three outboard packing rings 42, and three inboard packing rings 43. The number of outboard packing rings 42 and the number of inboard packing rings 43 may be each varied from the number shown in FIG. 2. Packing rings 42 are conveniently although not essentially identical in structure and composition with packing rings 43.

Disposed between the outboard packing rings 42 and the inboard rings 43 is an elastomeric lubricant distributing ring or "lantern ring" 44 of generally H-shaped cross section. Because of the cross-sectional configuration there is provided an inner lubricant distributing groove 46 and an outer lubricant distributing groove 48 in concentric relation to each other and shaft 14 when the parts are assembled. At uniformly spaced circumferential intervals there are provided radial lubricant transfer ports 50 communicating between inner groove 46 and outer groove 48 whereby lubricant distributed in outer groove 48 is permitted to move radially inwardly for distribution in inner groove 46. Outer groove 48 is supplied through a suitable fitting 51 including a passage 53 extending through the housing whereby a lubricant for the compressible packing members, e.g. grease, may be admitted under pressure to the outer groove 48 in lubricant distributing ring 44.

The width of outer groove 48 is such that the contemplated telescoping action of packing gland 22 will not so shift lubricant distributing ring 44 as to block passage of lubricant through the fitting 51 and passage 53 with the upstanding rims of ring 44 which border the groove 48. Under the influence of pressure on the lubricant and the fluid pressure under which the sealing system operates, lubricant is permitted to flow in an axial direction to either side of inner distributing groove 46 to provide lubrication for the interface between shaft 14 and packing members 42 and the interface between shaft 14 and packing members 43. The I.D. of lubricant distributing ring 44 is in excess of the O.D. of shaft 14 sufficiently that under no circumstances is there surface-to-surface contact between the distributing ring 44 and the shaft 14.

As the packing rings wear, improved sealing is normally effected by telescoping packing gland 22 more deeply into the packing member recess 40 by tightening bolts 24 in a manner well understood by those skilled in the art. As indicated above, inner flange 30 provides an annular reaction member for packing gland 22. The resilience of lubricant distributing ring 44 and the width of outer lubricant distributing groove 48 is adjusted so that communication between the fitting 51 and the outer groove 48 is not sealed by normal telescoping action of the packing gland. The rigidity of the lubricant distributing ring permits the transmission of the compressive force so that the seal between packing members 42 and the shaft may be improved as well as the seal between the shaft and packing members 43. A point is reached, however, where further telescoping of the packing gland 22 is ineffectual to restore adequate sealing, and replacement of some of all of packing members 42 and 43 is necessary. This repair can be effected from inside the vessel, but during this period a seal must be established between the shaft and the sealing member to prevent leakage of sea water into the hull. To achieve such a seal, a selectively operable inflatable ring seal is provided for coaction between the seal housing and the shaft.

In a preferred embodiment, the selectively operable ring seal is a pneumatically operated device although any fluid, liquid or gas, might be used for the purpose of effecting a peripheral seal between the ring seal and the shaft. The material of which the ring seal is formed is normally rubber, for example neoprene or Uitnite.

As indicated above, when the ring seal 34 is in its relaxed condition, sufficient clearance is provided between its shaft-confronting surface 38 (FIG. 2) and the shaft to permit axial flow of liquid along the shaft in an outboard direction and into the stern tube 8 for lubrication of the interface between the shaft and the bearing material. To provide for the introduction of such lubricating fluid, the present invention provides one or more openings 52 in the shaft-confronting surface 54 of internal flange 30 through which water may be introduced.

Openings 52 are desirably rectangular in shape and spaced at uniform intervals about the periphery or surface 54. Suitable taps 56 extending into housing 20 and communicating with the openings 52 are provided for the admission of water to the rubber seal shaft interface. Axial movement of the water from the openings, and circumferential movement thereof occasioned by rotation of the shaft effects suitable distribution for lubricating purposes. Relative movement of the shaft, for example rotation, with respect to the housing aids in distribution of the water lubricant. Inboard flow of the water lubricant is prevented by the application of pressure to the grease lubricant interposed between the shaft and the packing members 42. Where a plurality of taps 56 is employed, an external header (not shown) communicating with taps 56 and a source of water under pressure (also not shown) is utilized. In a preferred embodiment, two water inlets through housing 20 at 180° intervals are provided. The opening through the shaft-confronting surface 54 is for convenience rectangular, and the area of the opening corresponds to the circular area of the inlet pipe secured in the tapped hole 56. In practice, the circular pipe entrance is "faired" into the rectangular-shaped area to allow a constant flow volume from one geometric configuration to the other. Once the water passes through the rectangular-shaped opening, it is distributed around the shaft journal immediately to provide total lubrication of the seal/shaft interface as it moves axially in an outboard direction through the distensible seal region. This design is best illustrated in FIG. 5.

The introduction of the water lubricant through a flange between the packing recess and the distensible, or inflatable, ring seal recess utilizes to advantage such flange which must in any event be provided, and avoids the necessity for a longer housing 20 to accommodate other means for introducing the lubricant medium for the stern tube bearing. Thus, expensive construction and unnecessarily extended housing means are avoided without loss of effectiveness of the device as a sealing member.

Now more particularly to FIG. 4, there is shown on an enlarged scale a portion of a stuffing box or shaft seal in cross section and illustrating an improved distensible elastomeric ring-type sealing member 34 useful in the present invention. Instead of a simple toroidal inflatable ring seal, there is provided an interlocked distensible seal member 34 coextensive with recess 32 and defining with the housing 20 an annular free space 60 adapted to receive fluid under pressure from an external source. To this end, shaft seal housing 20 is provided with a fluid inlet port 62 drilled and tapped to receive a valve stem 64 and a gas valve fitting 66 through which a gas under pressure may be admitted to the annular free space 60.

Distensible seal member 34 is, as indicated above, formed from an elastomeric material such as rubber.

Seal member 34 may be formed by any suitable means, for example by extrusion, and is dimensioned to fit tightly within a recess 32. Lateral grooves 70 and 72 extend axially in opposite directions and constitute undercut portions within the recess 32. This structure provides highly satisfactory locking action and eliminates the multiple fastenings utilized according to the prior art.

Distensible seal member 34, as above indicated, is an annular, generally ring-shaped body and is characterized by upstanding sidewall portions 74 and 76. Sidewall portions 74 and 76 are maintained in spaced relation by an integral annular spacing web or member 78 joined to sidewalls 74 and 76, respectively, at a point intermediate their inner and outer radial extremities 80 and 82, and inner and outer extremities 84 and 86, respectively. Axially outwardly extending flanges 81 and 83 are provided for interlocking coaction with grooves 72 and 70, respectively. A distensible annular web 88 joins the inner radial extremities 80 and 84 of sidewalls 74 and 76, respectively. Annular web 88 is spaced from annular spacing member 78 in a radially inwardly direction and defines therewith a free annular space 90 bounded by web 88, spacer 78 and sidewalls 74 and 76. Spacing member 78 is pierced at intervals around its circumference to provide passages 92 for the flow of distending fluid into and out of annular space 90.

As sown in FIG. 6, the flanges 81 and 83 are provided with a circumferential ridge or projecting ribs 85 which extend axially outwardly from flange portion 83 and providing a resiliently compressible bead for sealing coaction in groove 70. These beads are compressed inwardly when the seal is installed and provide pressure zones which improve the sealing relationship between the grooves 70 and 72 and the flanges 83 and 81, respectively.

In the preferred embodiment shown in FIG. 4, the spacing member 78 is considerably thicker than the distensible web 88; for example, the spacing member 78 may be from two to three times as thick as the distensible web 88. It is also desirable in forming the distensible seal member that the shaft-confronting surface 38 of annular web 88 should be arched in a concave manner when in the relaxed or unpressurized state shown in FIG. 6. This provides maximum separation or clearance from the moving journal surface without actually being too far removed for effective distension purposes.

As above indicated, the distensible seal member 34 is dimensioned for fitting within the recess 32. To this end, annular spacing member 78, which because of its thickness has a degree of structural rigidity considerably greater than the distensible web 88, is dimensioned to exert a laterally directed compressive force against the sidewalls 74 and 76. In the relaxed or unpressurized condition, annular spacing member 78 may be slightly bowed in a radially outward direction. When fluid under pressure is admitted through valve stem 64, the seals, or surface-to-surface contacts, between the resilient sidewalls 74 and 76 and the radially extending sidewall portions 98 and 100 of flanges 102 and 104, respectively, are improved. Introduction of fluid under pressure also exerts a radially inwardly directed force upon distensible seal member 34 and effects a tighter seal between axially extending shoulder portions 112 and 114 in corresponding grooves 70 and 72. Also, the admission of fluid pressure into the peripheral groove 60 through the agency of passages 92 is transmitted into annular space 90 which effects a distension of annular web 88 and brings it into sealing engagement with shaft 14.

The web 88 is formed so that in its unstressed condition, illustrated in FIG. 6, it is concave and is arched away from the shaft. Therefore, when the seal is inflated to the operative position of FIG. 4 the web is not stretched so there is no tendency for it to take a permanent set.

During inflation the web 88 must be compressed until it passes through its center position before it moves to the concave operative position. With this structure the web 88 itself provides a spring force urging it away from the shaft. The seal is also preferably provided with webs 88a which extend between the member 78 and the web 88. These webs 88a are placed in tension when the seal is inflated and provide an additional spring force urging the web back to its concave position when the seal is deflated. These spring forces cooperate to insure that the entire inner surface 38 is spaced from the shaft when the seal is deflated so no wear can occur. In fact the spring forces are arranged so that proper spacing is provided even when a residual pressure of about 2 pounds per square inch is allowed to remain in the seal.

In the manner previously described, the interface between the rubber bearing material in stern tube or bearing 8 and metallic shaft 14 is lubricated by means of water introduced under pressure through one or more ports 52 or openings in inner flange 30. The housing 20 is drilled and tapped at 56 to accept a nipple for introduction of water.

There has thus been provided a shaft seal or stuffing box, especially useful as a shaft seal for marine vessels and which is characterized by grease lubricated annular packing members in one portion thereof and a selectively operable distensible sealing member to provide an auxiliary or temporary seal in the event that repair or replacement of the principal packing seals is required, which shaft seal is characterized in that the water lubricant for a stern bearing is admitted through a flange member which separates the standby sealing means from the main sealing means and thereby utilizes this member for an additional purpose and achieves the economy of spaced and material without adversely affecting the operation of the device.

We claim:
1. A shaft seal comprising:
 a. a housing;
 b. a pair of axially spaced inwardly directed peripheral shoulders each having a shaft-confronting surface and defining between them a first peripheral recess;
 c. first fluid inlet means extending through the housing and communicating with said first peripheral recess;
 d. a second peripheral recess adjacent the first peripheral recess and isolated therefrom by one of said peripheral shoulders;
 e. a packing gland dimensioned for telescoping coaction in said second peripheral recess;
 f. at least one fluid inlet opening in the shaft-confronting surface of said one of said peripheral shoulders;
 g. second fluid inlet means extending through the housing for fluid communication with said fluid inlet opening;
 h. selectively distensible sealing means in said first peripheral recess;
 i. means for supplying fluid to said distensible sealing means for selectively distending the seal
 j. said selectively distensible sealing means being a closed peripheral sealing member having:
  1. a pair of spaced peripheral sidewall members each dimensioned for tight juxtaposition with the corresponding sidewall of said first peripheral recess, and each having inner and outer marginal edges;
  2. a spacing member having inner and outer surfaces and being integral and disposed between said sidewall members for maintaining them in spaced relation, and being joined to said sidewall members, respectively, in a region intermediate the inner and outer marginal edges thereof in generally H-shaped cross-sectional configuration;
  3. an impervious distensible member joining the inner marginal edges of said sidewall members respectively and inwardly spaced from the inner surface of said spacing member to form a fluid receiving channel therebetween; and
  4. fluid passage means communicating between the outer surface of said spacing member and said fluid receiving channel whereby when fluid under pressure from said first fluid inlet means (c) is introduced to said channel, said distensible member is distended.

2. A shaft seal comprising:
 a. a housing;
 b. a pair of axially spaced inwardly directed peripheral shoulders each having a shaft-confronting surface and defining between them a first peripheral recess;
 c. first fluid inlet means extending through the housing and communicating with said first peripheral recess;
 d. a second peripheral recess adjacent the first peripheral recess and isolated therefrom by one of said peripheral shoulders;
 e. a packing gland dimensioned for telescoping coaction in said second peripheral recess;
 f. at least one fluid inlet opening in the shaft-confronting surface of said one of said peripheral shoulders;
 g. second fluid inlet means extending through the housing for fluid communication with said fluid inlet opening;
 h. compressible packing means in said second peripheral recess including a plurality of individual closed peripheral packing members coextensive with said second peripheral recess;
 i. means for supplying lubricant for said compressible packing to the compressible packing means;
 j. an elastomeric closed peripheral lubricant distributing member disposed between two of said packing members and having an H-shaped cross section to provide inner and outer lubricant distributing channels on the inner, shaft-confronting surface and the other, housing-confronting surface, respectively, of said member;
 k. selectively distensible peripheral sealing means in said first peripheral recess coextensive with said recess having;

1. a pair of spaced peripheral sidewall members each dimensioned for tight juxtaposition with the corresponding sidewall of said first peripheral recess, and each having inner and outer marginal edges;
2. a spacing member having inner and outer surfaces and being integral with and disposed between said sidewall members for maintaining them in spaced relation, and being joined to said sidewall members, respectively, in a region intermediate the inner and outer marginal edges thereof in generally H-shaped cross-sectional configuration;
3. an impervious distensible member joining the inner marginal edges of said sidewall members respectively and inwardly spaced from the inner surface of said spacing member to form a fluid receiving channel therebetween; and
4. fluid passage means communicating between the outer surface of said spacing member and said fluid receiving channel whereby when fluid under pressure from said first fluid inlet means (c) is introduced to said channel, said distensible member is distended;

l. means for supplying fluid to said distensible sealing means for selectively distending the seal.

3. A marine shaft seal comprising a seal housing assembly, a shaft extending through said housing assembly, said housing assembly providing a pair of axially spaced inwardly extending shoulders at least one of which is integrally formed in said housing, each shoulder having a shaft-confronting surface adjacent to said shaft and defining between them a first annular recess around said shaft, an inflatable seal in said first recess operable when inflated to provide a fluid seal between said shaft and housing assembly and when deflated permitting fluid flow along said shaft therepast, a second annular recess in said housing defined in part by the side of said integral shoulder opposite said first annular recess, a packing means in said second recess engaging said side of said integral shoulder and operating to limit the flow of fluid along said shaft when said inflatable seal is deflated, and lubricant passage means in said integral shoulder opened to said shaft-confronting surface, lubricant under pressure flowing inwardly through said passage means and along said shaft past said inflatable seal when said inflatable seal is deflated, said inflatable seal tending to evenly distribute said lubricant around said shaft, said lubricant assisting in providing separation between said inflatable seal and said shaft when said inflatable seal is deflated.

4. A marine shaft seal as set forth in claim 6 wherein said inflatable seal and said last named means are both formed of rubberlike material, and said lubricant is water.

5. A marine shaft seal as defined in claim 3 wherein said packing means includes compressible packing material in said second annular recess, and separate lubricant supply means are provided in said housing assembly for said packing means.

6. A marine shaft seal as set forth in claim 3 wherein means requiring lubrication are provided on the side of said inflatable seal opposite said packing gland, and said lubricant flows past said inflatable seal to said last named means providing lubrication thereof.